United States Patent
Lemmers, Jr.

(10) Patent No.: US 9,784,380 B2
(45) Date of Patent: Oct. 10, 2017

(54) VALVE ASSEMBLY FOR VARIABLE FREQUENCY GENERATOR AND METHOD OF SEALING

(71) Applicant: Hamilton Sundstrand Corporation, Charlotte, NC (US)

(72) Inventor: Glenn C. Lemmers, Jr., Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 93 days.

(21) Appl. No.: 14/880,802

(22) Filed: Oct. 12, 2015

(65) Prior Publication Data

US 2017/0102083 A1 Apr. 13, 2017

(51) Int. Cl.
 *F16K 24/04* (2006.01)
 *F16K 17/02* (2006.01)
 *H02K 9/24* (2006.01)

(52) U.S. Cl.
 CPC .............. *F16K 24/04* (2013.01); *F16K 17/02* (2013.01); *H02K 9/24* (2013.01)

(58) Field of Classification Search
 CPC ............ F16K 24/04; F16K 17/02; H02K 9/24
 See application file for complete search history.

(56) References Cited

U.S. PATENT DOCUMENTS

| 2,395,979 | A | * | 3/1946 | Tucker et al. | ............ | F15B 9/14 91/375 R |
|---|---|---|---|---|---|---|
| 3,743,303 | A | | 7/1973 | Pope | | |
| 6,092,611 | A | * | 7/2000 | Saxman | .................. | E21B 10/24 175/227 |
| 6,158,970 | A | | 12/2000 | Ota et al. | | |
| 8,998,564 | B2 | * | 4/2015 | Lemmers, Jr. et al. | | F01D 5/026 415/116 |
| 2012/0237337 | A1 | | 9/2012 | Lemmers, Jr. | | |
| 2013/0270944 | A1 | | 10/2013 | Biessenberger | | |

FOREIGN PATENT DOCUMENTS

| EP | 0589337 A1 | 3/1994 |
|---|---|---|
| GB | 2367780 A | 4/2002 |

OTHER PUBLICATIONS

Extended European Search Report regarding related EP App. No. 16193515.0; dated Mar. 8, 2017; 5 pgs.

* cited by examiner

*Primary Examiner* — Kevin Lee
(74) *Attorney, Agent, or Firm* — Cantor Colburn LLP

(57) ABSTRACT

A valve assembly for a variable frequency generator includes an input shaft extending about a longitudinal axis and having a bore defined therein. Also included is a disconnect shaft extending about the longitudinal axis and disposed in abutment with the input shaft. Further included is an oil restrictor disposed with the bore of the input shaft. Yet further included is a vent valve disposed within the bore and in abutment with the oil restrictor, the vent valve comprising an angled wall, the angled wall partially defining an annulus. Also included is a plurality of ball bearings disposed within the annulus, the plurality of ball bearings sliding radially outwardly away from the longitudinal axis during rotational operation of the input shaft to apply a force on the angled wall of the vent valve to bias the vent valve axially into a sealed condition.

15 Claims, 3 Drawing Sheets

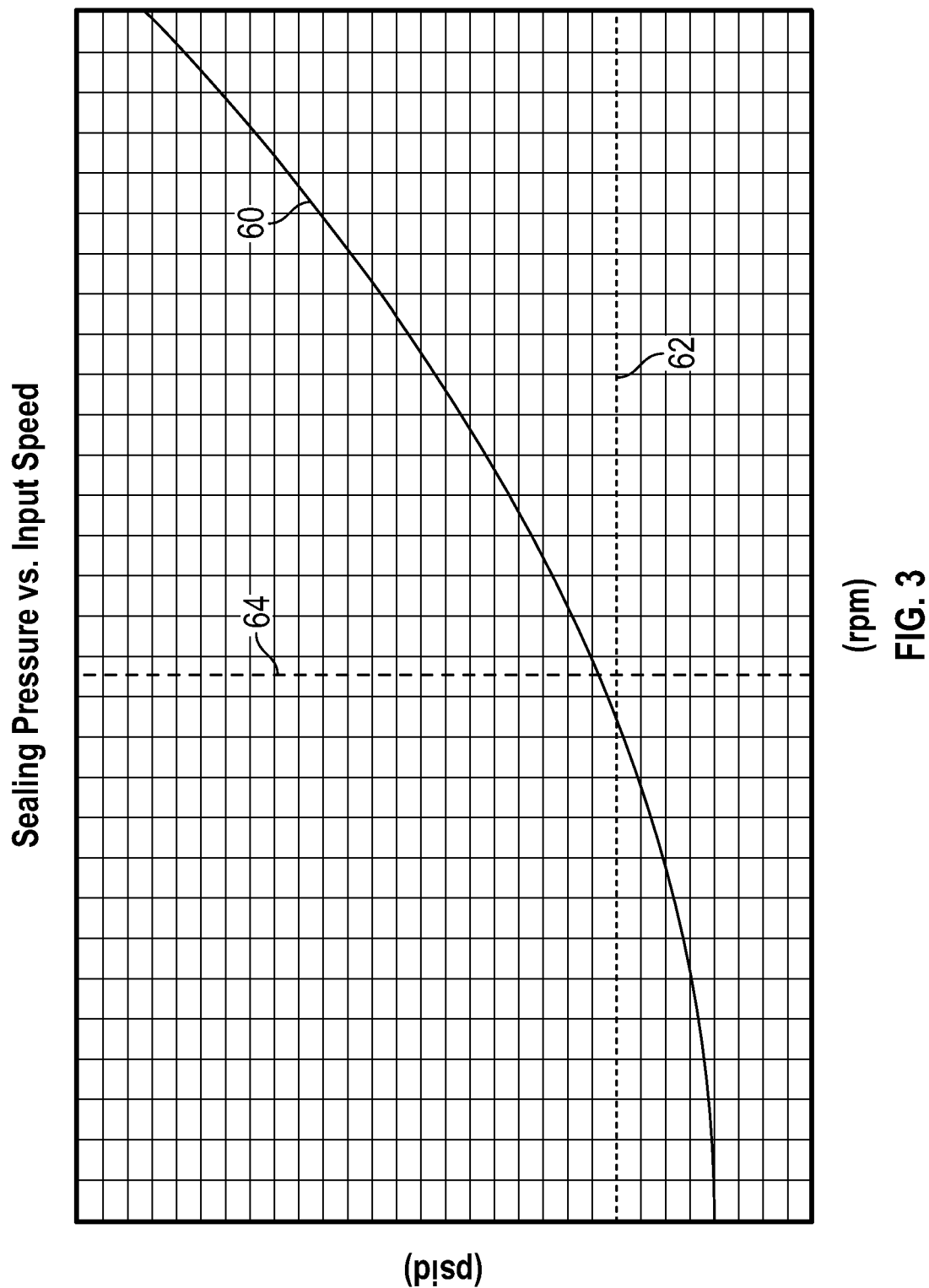

VALVE ASSEMBLY FOR VARIABLE FREQUENCY GENERATOR AND METHOD OF SEALING

BACKGROUND OF THE INVENTION

The embodiments herein generally relate to variable frequency motors/generators (VFGs) or integrated drive generators (IDGs) and, more particularly, to a valve assembly for such generators, as well as a method of sealing and venting generators.

During operation of variable frequency generators used in aerospace applications, it has been observed that internal case pressure may increase over time and achieve a level sufficient to actuate case pressure relief valve during operation. Such actuation may result in a loss of oil overboard. The increased case pressure is caused by a non-contact lift-off seal that pumps air into the generator. Over time, the cycle of increasing pressure and venting may undesirably lead to an insufficient oil level within the generator.

BRIEF DESCRIPTION OF THE INVENTION

According to one embodiment, a valve assembly for a variable frequency generator includes a input shaft extending about a longitudinal axis and having a bore defined therein. Also included is a disconnect shaft extending about the longitudinal axis and disposed in abutment with the input shaft. Further included is an oil restrictor disposed within the bore of the input shaft. Yet further included is a vent valve disposed within the bore and in abutment with the oil restrictor, the vent valve comprising an angled wall, the angled wall partially defining an annulus. Also included is a plurality of ball bearings disposed within the annulus, the plurality of ball bearings sliding radially outwardly away from the longitudinal axis during rotational operation of the input shaft to apply a force on the angled wall of the vent valve to bias the vent valve axially into a sealed condition.

According to another embodiment, a method of sealing a variable frequency generator is provided. The method includes imparting a centrifugal force on a plurality of ball bearings disposed within an annulus partially defined by an angled wall of a vent valve disposed within a bore of an input shaft. The method also includes moving the plurality of ball bearings radially outwardly in response to the centrifugal force. The method further includes biasing the vent valve axially during movement of the plurality of ball bearings, wherein biasing the vent valve places the vent valve in a sealed condition.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 3 is a plot of sealing pressure against input speed illustrating venting pressures during various operating conditions of the variable frequency generator.

DETAILED DESCRIPTION OF THE INVENTION

Figure 1:
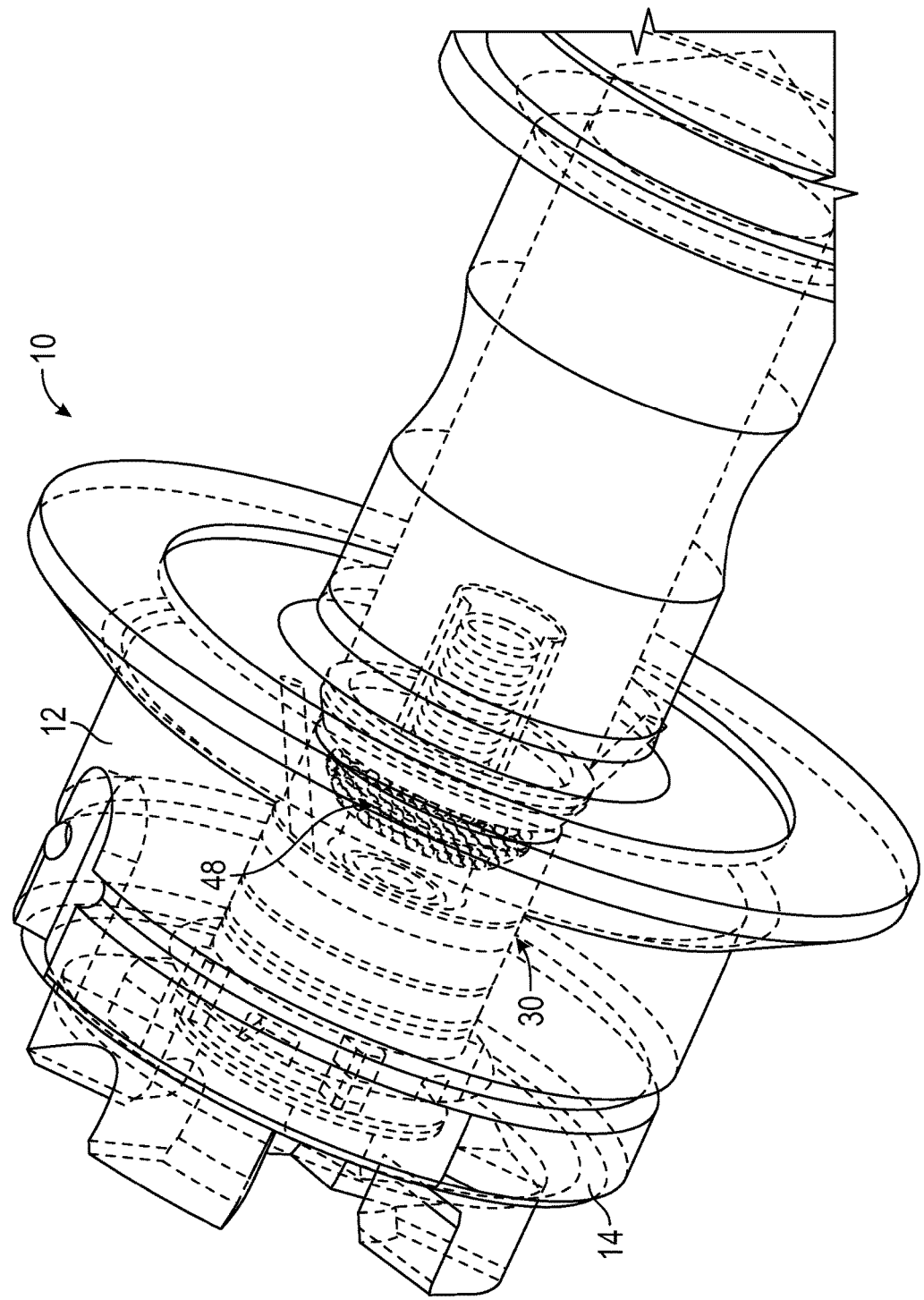
FIG. 1 is a perspective view of a variable frequency generator input shaft.
Figure 2:
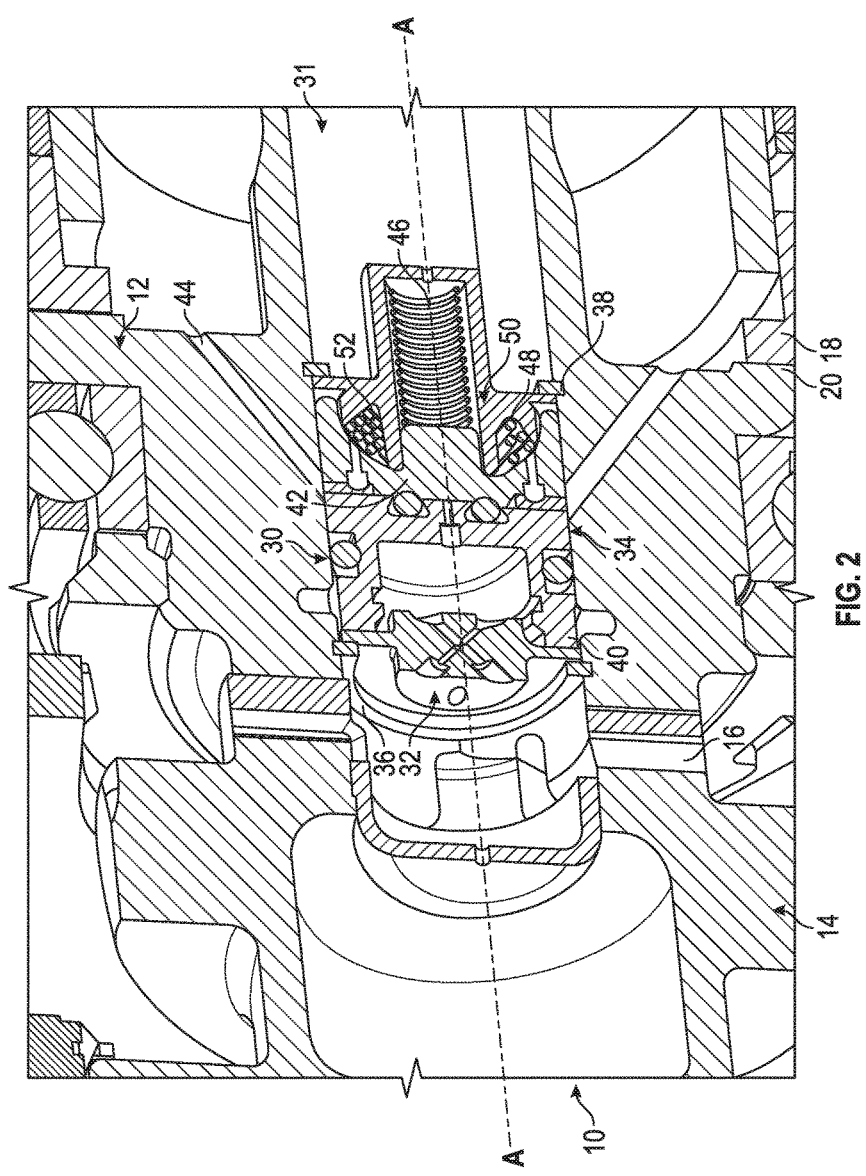
FIG. 2 is a cross-sectional view of the variable frequency generator illustrating a valve assembly for axial venting of the variable frequency generator.

Referring to FIGS. 1 and 2, a variable frequency generator (VFG) 10 is partially illustrated. In particular, a portion of the VFG 10 is shown proximate an interface of an input shaft 12 and a disconnect jaw (face clutch) 16, each extending along an axis A of the VFG 10. The VFG 10 may be employed in a variety of applications. In some embodiments, the VFG is used in aerospace applications. The VFG 10 includes a face clutch 16 that facilitates engagement and disengagement of the input shaft 12 and the disconnect shaft 14. Multiple sealing elements are employed such as a carbon seal 18 that is disposed proximate the input shaft 12 and a mating ring 20.

The VFG 10 includes a pressure relief valve (not shown) that is configured to vent the VFG case if a case pressure exceeds a maximum predefined pressure. Such venting undesirably leads to oil being leaked out of the VFG case. To reduce or eliminate the undesirable loss of oil, a valve assembly 30 is provided and at least partially disposed within a bore 31 of the input shaft 12. The valve assembly 30 is configured to vent residual case pressure upon shutdown of an engine that the VFG 10 is operated in conjunction with if the internal case pressure of the VFG 10 exceeds a minimum set point, while also sealing against a minimum required case pressure during operation, as will be appreciated from the description herein.

The valve assembly 30 comprises an oil restrictor 32 and a vent valve 34 axially stacked in abutment along the axis A. The components of the valve assembly 30 are at least partially axially retained within a predefined space with a first retaining ring 36 and a second retaining ring 38, each ring located at a respective end of the valve assembly 30. In some embodiments the vent valve 34 is a single component. In other embodiments, such as the illustrated embodiment, the vent valve 34 comprises a first valve portion 40 and a second valve portion 42. In the illustrated embodiment, the second valve portion 42 is a floating (i.e., moveable) component that is axially moveable along the axis A.

The vent valve 34 is moveable between a sealed condition and an open condition. The sealed condition prohibits venting of the VFG case by covering at least one air release passage 44 defined by the input shaft 12. In the open condition, the vent valve 34 is positioned to uncover at least one air release passage 44 to allow air to be vented. The second valve portion 42 is biased toward the sealed condition with a preload spring 46 that is in direct or indirect contact with the second valve portion 42 to bias the vent valve 34. The spring force is sufficient to maintain the valve assembly 30 in the sealed condition up to a desired case pressure. This force is overcome by sufficient case pressure buildup to move the second valve portion 42 to the open condition for venting during shutdown conditions.

During operating conditions of the engine with which the VFG 10 is employed, a stronger sealing force is required to ensure that venting does not occur during operation. To facilitate sufficient sealing, a plurality of ball bearings 48 are disposed within an annulus 50 defined partially by an angled wall 52 of the second valve portion 42. In some embodiments, the ball bearings 48 are formed of tungsten carbide, but alternative materials are contemplated. The centrifugal force associated with rotation of the VFG 10 during operation slides the ball bearings 48 radially outwardly. This outward movement of the ball bearings 48 along the angled wall 52 of the second valve portion 42 imposes an axial force on the second valve portion 42 toward the sealed condition of the vent valve 34, thereby ensuring that venting does not occur during operation. As one can appreciate, as the rotational speed increases, the centrifugal and axial forces are increases as well to provide enhanced sealing capabilities as the VFG 10 speeds up.

Referring now to FIG. 3, a range of pressures is plotted as a function of rotational speed of the VFG 10 (e.g., input shaft 12). The curve represented with numeral 60 represents the case pressures at which the valve assembly 30 sufficiently seals the VFG case over a range of rotational speeds of the VFG 10. The vent valve 34 is in the open condition if the pressure exceeds the loci of the curve 60. Conversely, the vent valve 34 is in the sealed condition if the pressure is less than the loci of the curve 60. It is to be appreciated that the curve 60 depicted is dependent upon the particular application and may be adjusted, as needed, by changing the ball bearing density, quantity, operating area and sealing area, or preload spring, for example.

The line 62 represents the above-referenced minimum predefined pressure of the pressure relief valve. As shown, the curve 60 seals up to a higher pressure than the minimum predefined pressure of the pressure relief valve over an entire range of rotational speeds greater than a predetermined rotational speed, as defined by line 64. In some embodiments, the predetermined rotational speed is a minimum operating rotational speed of the VFG 10 and/or engine. In some embodiments, the predetermined rotational speed is about 10,000 rpm, but it is to be appreciated that this speed will vary depending upon the particular application of use. It is only below the predetermined rotational speed 64 that the curve 60 is below the line 62, thereby ensuring that case venting only occurs during shutdown conditions.

Advantageously, venting of the VFG case is provided only during shutdown to avoid any leakage of oil during flight in an aerospace application, while also providing adequate sealing of the case. Venting above a predetermined case pressure upon engine shutdown ensures generator case pressure does not build to a level necessary to actuate the case pressure relief valve.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A valve assembly for a variable frequency generator comprising:
    an input shaft extending about a longitudinal axis and having a bore defined therein;
    a disconnect shaft extending about the longitudinal axis and disposed in abutment with the input shaft;
    an oil restrictor disposed with the bore of the input shaft;
    a vent valve disposed within the bore and in abutment with the oil restrictor, the vent valve comprising an angled wall, the angled wall partially defining an annulus; and
    a plurality of ball bearings disposed within the annulus, the plurality of ball bearings sliding radially outwardly away from the longitudinal axis during rotational operation of the input shaft to apply a force on the angled wall of the vent valve to bias the vent valve axially into a sealed condition.

2. The valve assembly of claim 1, wherein the vent valve is in an open condition during a predetermined rotational speed of the input shaft.

3. The valve assembly of claim 2, wherein the valve assembly is part of a variable frequency generator, wherein the predetermined rotational speed comprises a minimum operating speed of the variable frequency generator.

4. The valve assembly of claim 2, wherein the predetermined rotational speed is less than 10,000 rpm.

5. The valve assembly of claim 2, wherein the valve assembly is part of a variable frequency generator, wherein speeds less than the predetermined rotational speed comprise a shutdown condition of the variable frequency generator.

6. The valve assembly of claim 1, wherein the plurality of ball bearings are formed of tungsten carbide.

7. The valve assembly of claim 1, further comprising a preload spring disposed in contact with the vent valve to bias the vent valve axially.

8. The valve assembly of claim 1, wherein the vent valve comprises a first valve portion and a second valve portion, the second valve portion configured to move axially within the bore of the input shaft.

9. The valve assembly of claim 8, wherein the plurality of ball bearings are in contact with the second valve portion.

10. A method of sealing a variable frequency generator comprising:
    imparting a centrifugal force on a plurality of ball bearings disposed within an annulus partially defined by an angled wall of a vent valve disposed within a bore of an input shaft;
    moving the plurality of ball bearings radially outwardly in response to the centrifugal force; and
    biasing the vent valve axially during movement of the plurality of ball bearings, wherein biasing the vent valve places the vent valve in a sealed condition.

11. The method of claim 10, further comprising biasing the vent valve with a preload spring disposed in contact with the vent valve.

12. The method of claim 10, wherein the vent valve is in the sealed condition at rotational speeds greater than a predetermined rotational speed.

13. The method of claim 12, wherein the predetermined rotational speed is a minimum operating speed of the variable frequency generator.

14. The method of claim 12, wherein the vent valve is in an open position at speeds less than the predetermined rotational speed.

15. The method of claim 12, wherein the vent valve vents pressure within the variable frequency generator during a shutdown condition of the variable frequency generator.

* * * * *